United States Patent
Hansen et al.

(10) Patent No.: US 8,286,880 B2
(45) Date of Patent: Oct. 16, 2012

(54) SECURITY DOCUMENT AND METHOD FOR THE PRODUCTION THEREOF

(75) Inventors: Achim Hansen, Zug (CH); Christina Streb, Abtwil (CH)

(73) Assignee: OVD Kinegram AG, Zug (CH)

( * ) Notice: Subject to any disclaimer, the term of this patent is extended or adjusted under 35 U.S.C. 154(b) by 323 days.

(21) Appl. No.: 12/739,500

(22) PCT Filed: Oct. 16, 2008

(86) PCT No.: PCT/EP2008/008759
§ 371 (c)(1),
(2), (4) Date: Jun. 8, 2010

(87) PCT Pub. No.: WO2009/056228
PCT Pub. Date: May 7, 2009

(65) Prior Publication Data
US 2012/0031978 A1    Feb. 9, 2012

(30) Foreign Application Priority Data
Oct. 30, 2007  (DE) .................. 10 2007 052 176

(51) Int. Cl.
*G06K 19/00* (2006.01)
(52) U.S. Cl. .................. 235/487; 235/488; 235/494
(58) Field of Classification Search .................. 235/487, 235/488, 494
See application file for complete search history.

(56) References Cited

U.S. PATENT DOCUMENTS

| | | | |
|---|---|---|---|
| 4,506,915 | A | 3/1985 | Haghiri-Tehrani et al. |
| 4,856,857 | A | 8/1989 | Takeuchi et al. |
| 5,251,937 | A | 10/1993 | Ojster |
| 6,428,051 | B1 | 8/2002 | Herrmann et al. |
| 2006/0055169 | A1 | 3/2006 | Reinhart |
| 2007/0246932 | A1 | 10/2007 | Heine et al. |
| 2008/0160226 | A1 | 7/2008 | Kaule et al. |

*Primary Examiner* — Kristy A Haupt
(74) *Attorney, Agent, or Firm* — Hoffmann & Baron, LLP

(57) ABSTRACT

The invention relates to a security document (10) having a carrier substrate (1) and at least one first film element (2) which is fixed to the carrier substrate (1) and shows a first optically variable effect generated by a diffractive first relief structure, wherein the security document (10) furthermore has at least one first printing ink layer (5) which is applied in a region-wise fashion onto the at least one first film element, and at least one second film element (3), and to a method for the production, of the security document (10).

26 Claims, 1 Drawing Sheet

SECURITY DOCUMENT AND METHOD FOR THE PRODUCTION THEREOF

This application claims priority based on an International Application filed under the Patent Cooperation Treaty, PCT/EP2008/008759, filed on Oct. 16, 2008 and German Application No. DE 102007052176.8-45, filed on Oct. 30, 2007.

BACKGROUND OF THE INVENTION

The invention relates to a security document having a carrier substrate and at least one first film element which is fixed to the carrier substrate and shows a first optically variable effect generated by a diffractive first relief structure, wherein the security document furthermore has at least one first printing ink layer which is applied in a region-wise fashion onto the at least one first film element. The invention furthermore relates to a method for the production of such a security document.

Security documents of the abovementioned type are sufficiently known from U.S. Pat. No. 4,856,857. Here, transparent film elements which show a hologram are fixed to the substrate of a security document, for example of a deposit certificate, of a magnetic card, of a credit card and the like. The security document furthermore has a visually perceivable display region having a letter or image pattern, which shows for example personal data of the holder of the security document and is arranged directly on or in the substrate and is at least partially covered by the transparent film element. Such a letter or image pattern can also be situated on the film element or integrated in the layer structure of the film element. The principle layer structure of the film element has a transparent layer which has on one of its two sides a relief structure which generates a hologram and adjoins a thin film or a reflection layer, wherein the refractive indices of the transparent layer and of the thin film are different. The security document including the film element is coated with a transparent protective layer or is laminated between such protective layers.

It has been shown that the known security documents can be manipulated or forged by grinding off the substrate, starting from the rear side, until the film element, possibly including the protective layer, is left. Subsequently, the film element can be adhesively bonded onto another substrate, which was previously provided with the desired data. If letter or image patterns are likewise arranged on the film element or between the film element and a protective layer, they can be ground off or detached in advance starting from that side of the film element, possibly including the protective layer, which faces away from the substrate. This is followed by a new application of changed letter or image patterns onto the film element, the application of a new protective layer, the above-described grinding-off of the substrate starting from the rear side thereof, and so on.

Alternatively, a security document can be manipulated by lifting the protective layer including the film element off the substrate, inserting a thin sheet with the desired data and restoring the composite, for example by way of laminating it. If the film element on the security document is not protected by a transparent protective layer, it can be lifted off with an adhesive transparent film, the data on the substrate can be manipulated, and the film element including the transparent film, cut to the size of the film element, can be re-applied.

SUMMARY OF THE INVENTION

It is now an object of the invention to provide security documents which are protected better against the above-listed manipulations, and to specify a method for the production of such security documents.

The object is achieved by a security document having a carrier substrate and at least one first film element which is fixed to the carrier substrate and shows a first optically variable effect generated by a diffractive first relief structure, wherein the security document furthermore has at least one first printing ink layer which is applied in a region-wise fashion onto the at least one first film element, in that the at least one first printing ink layer is furthermore applied in a region-wise fashion onto the carrier substrate, wherein the regions of the at least one first printing ink layer, which are applied onto the at least one first film element and onto the carrier substrate, together provide a first information item which can be read, in that the security document has at least one second film element which shows a second optically variable effect generated by a diffractive second relief structure, wherein the at least one second film element is transparent or at least transparent in regions, and in that the at least one second film element is fixed at least in regions to the at least one first film element and furthermore to regions of the carrier substrate which are free from the at least one first film element, wherein at least regions of the at least one first printing ink layer are arranged between the at least one first film element and the at least one second film element and can be read through the at least one second film element.

The security document according to the invention is protected particularly effectively against manipulation since the first information item is protected on its side which faces the carrier substrate by the at least one first film element and the first information item is protected on its side which faces away from the carrier substrate by the at least one second film element. In this case, regions of the first information item are protected both by a first and by a second film element since they are arranged such that they are embedded between the film elements. The embedded regions of the first information item cannot be removed simply by grinding off the carrier substrate, but the at least one first film element, the reproduction of which is possible only with great technical complexity or is even impossible, must also be removed. Access to the embedded regions of the first information item is also blocked from the other side, specifically by the at least one second film element, with the result that here the at least one second film element would have to be removed, with the reproduction of the at least one second film element likewise being possible only with great technical complexity or even being impossible. In this way, at least that part of the first information item which is embedded between the at least one first film element and the at least one second film element is not accessible for manipulation, with the result that use of the isolated composite of the at least one first film element and the at least one second film element is not suitable for application onto forged or manipulated security documents.

The optically variable effect produced by the first or second diffractive relief structure can take the form, on the respective film element, of a viewing angle-dependent color change effect and/or contrast change and/or motive change, a formation of a holographic or cinematographic representation, and so on.

The first and the second film elements can, in principle, be formed either by a self-supporting laminating film, which can be laminated onto a carrier substrate, or by a thin, non-self-supporting transfer layer of a transfer film. A transfer film has a carrier film and, thereon, the non-self-supporting transfer layer, which is typically composed of a plurality of different thin layerings and can be detached from the carrier film. The transfer film is pressed against the carrier substrate by means of a tool, wherein a region of the transfer layer remains stuck to the carrier substrate. When peeling the carrier film off the carrier substrate to be protected, the pressed-on region of the transfer layer remains stuck directly or indirectly to the carrier substrate and forms a thin film element, typically having a film thickness in the range of 3 to 25 μm. A laminating film, in contrast, has a substantially higher film thickness, typically in the range of 15 to 250 μm, wherein the laminating film is also typically composed of a plurality of different layerings.

The at least one first printing ink layer is preferably printed onto the at least one first film element and the carrier substrate. Alternatively, the at least one first printing ink layer can also be printed onto the at least one second film element and can be applied together with the latter onto the at least one first film element and the carrier substrate.

The at least one first printing ink layer is preferably printed using an inkjet printing method, but other printing methods such as gravure printing, screen printing and so on can also be used. The at least one first printing ink layer is preferably formed by printing at least one aqueous printing ink medium and subsequently drying it.

It has proven advantageous if the at least one first film element has a film thickness in the range of 3 to 25 μm. The at least one first printing ink layer can be printed on such thin film elements simply and without the printed image being distorted or negatively affected in the region of the circumference of the first film element.

In particular, the use of a transfer film, which has a carrier film and a transfer layer which can be detached therefrom, for forming the at least one first film element on the carrier substrate is ideal since transfer layers can be formed such that they are particularly thin and have the desired layer structure for forming the first film element.

The at least one first film element has at least one transparent first plastics or lacquer layer and at least one first reflection layer, wherein the diffractive first relief structure is formed in a first boundary surface between the at least one first plastics or lacquer layer and the at least one first reflection layer, in particular by way of embossing.

The at least one first film element can be formed to be opaque, semi-transparent or regionally or completely transparent. The first reflection layer must be formed to be, correspondingly therewith, opaque, semi-transparent or transparent. Metallic layers, especially from aluminum, silver, gold, copper, nickel, and so on are suitable for forming opaque reflection layers. For forming transparent reflection layers, reference is made to U.S. Pat. No. 4,856,857, in which a large number of transparent reflection layers from metallic or dielectric materials are described in detail. Particularly preferred in this case is the use of ZnS, ZnO, $TiO_2$, $SiO_2$ and $In_2O_3$ for forming a transparent reflection layer. Semi-transparent reflection layers are formed, for example, by partially removing an opaque reflection layer such that the reflection layer is present in the form of a raster, line raster or dot raster.

It has proven advantageous if the at least one second film element has a film thickness in the range of 3 to 250 μm. The at least one second film element is preferably formed by a non-self-supporting, thin transfer layer of a transfer film or by a self-supporting laminating film.

The at least one second film element also preferably has at least one transparent second plastics or lacquer layer and at least one transparent or regionally formed opaque second reflection layer, wherein the diffractive second relief structure is formed in a boundary surface between the at least one second plastics or lacquer layer and the at least one second reflection layer.

Alternatively, the at least one second film element can also comprise only the at least one transparent second plastics or lacquer layer. In this case, the diffractive second relief structure does not border a reflection layer which is applied onto the plastics or lacquer layer, but rather air, wherein the air acts like a reflection layer, as long as the difference between the refractive index of the air and that of the plastics or lacquer layer is sufficiently great.

The at least one second film element can be formed to be regionally or completely transparent, wherein here a region of the second film element is referred to as transparent if at least the parts of the first information item which are arranged underneath it can be read visually through the second film element. The first reflection layer must be formed, correspondingly therewith, to be semi-transparent or transparent. For forming transparent reflection layers, here, too, reference is made to U.S. Pat. No. 4,856,857, where a large number of transparent reflection layers from metallic or dielectric materials are described in detail. Particularly preferred in this case is the use of ZnS, ZnO, $TiO_2$, $SiO_2$ and $In_2O_3$ for forming a transparent reflection layer. Semi-transparent reflection layers are formed, for example, by partially removing an opaque reflection layer such that the reflection layer is present in the form of a pattern, raster, line raster or dot raster.

The first and the second film element can comprise further layers which are formed over a whole area or in the form of a pattern, such as an adhesive layer for fixing the film element, such as at least one adhesion-promoter layer, for example in order to ensure adhesion of the at least one first printing ink layer to the surface of the first film element or the internal bond of a film element, such as a magnetic layer, such as an electrically conducting layer, such as an optically variable layer, which includes, for example, liquid crystal layers, luminescent layers, photochromic layers and so on, and also paint layers and the like.

It has proven useful if the first information item, which is produced by the at least one first printing ink layer, provides personal data of a holder of the security document. "Personal data" is considered to refer to the name, the address, the date of birth, a picture or biometric data of the holder of the security document. In particular the body height, the eye color, the iris print, a finger print, a hand print, etc. are used as the biometric data of the holder. In this case, a plurality of personal data items of the holder can, in combination, form the first information item. The first information item can also be provided by personal data of the holder of the security document, which data are present in the form of a code or are coded, in particular in the form of a barcode.

The at least one first printing ink layer is preferably colored and opaque when viewed under normal light conditions. However, it has also proven useful if the at least one first printing ink layer, when viewed under normal light conditions, is without color and transparent and contains luminescent substances which emit a color when subjected to UV radiation in the visible wavelength range. A combination of colored and opaque printing ink layers and non-colored and transparent, UV-light luminescent printing ink layers has also proven useful. In this case, the at least one first printing ink layer can provide a half-tone image, wherein the individual printing inks are printed in the raster in the form of dots such that a naked human eye cannot resolve or perceive the individual printing ink dots individually. At least two different color shades are already sufficient in order to create the impression for the viewer that it is a full color or true color image, or virtually a full color or true color image. However, at least three different color shades are preferably printed, for example red, green and blue or cyan, magenta and yellow, if appropriate in each case in combination with black and/or white.

The at least one first film element and the at least one second film element can show in each case alphanumeric characters, symbols, logos, image-type or figurative representations, lettering, a sequence of numbers, a graphic pattern, a code such as a barcode, and so on. The first optically variable effect and the second optically variable effect can be independent from each other here.

However, it has proven useful if the first optically variable effect and the second optically variable effect are matched to each other such that the at least one first film element and the at least one second film element together provide a second information item. For example, the at least one first film element can provide parts of an image-type representation and the at least one second film element can provide the remaining parts of this image-type representation, wherein this requires an exact and layer-accurate alignment of the film elements with respect to one another, so that the individual image parts complement each other to form the overall image-type representation for the viewer of the security element.

Moiré effects can also be produced as the second information item. Such a layer-accurate alignment of the film elements with respect to one another is complex and therefore hardly reproducible. It has been proven advantageous, in particular, if the second information item also provides personal data of a holder of the security document. Preferably, the second information item provides a holographic or cinematographic representation.

It is preferred if at least two first film elements are present. It has also proven useful if at least two second film elements are present.

It is particularly preferred if the contour shapes of the at least one first film element and of the at least one second film element are matched to each other and/or if the contour shapes of a plurality of first film elements are matched to one another and/or the contour shapes of a plurality of second contour shapes are matched to one another. For example, the contour of the at least one first film element can represent a tree trunk having branching branches and the contours of a plurality of second film elements form leaves in order to represent a tree and the like.

In order to further increase the protection against manipulation or imitation, the security document has in particular at least one IC microchip. The IC microchip can in this case have a chip design with contacts or be without contacts. It has proven useful in this case if the at least one first film element and/or the at least one second film element have an electrically conducting layering which is/are connected in an electrically conducting manner to the IC microchip. The electrically conducting layering can form an antenna structure, a capacitance and so on.

At least one second printing ink layer, which is arranged at least between the carrier substrate and the at least one first film element, is preferably printed onto the carrier substrate in a region-wise manner. The at least one second printing ink layer is used to apply preferably general details which repeat for each security element of the same type, such as the designation of the establishment, authority, region or country and so on which issues the security document. The at least one second printing ink layer can furthermore or alternatively be used for a graphic design or for creating a pattern on the carrier substrate.

The carrier substrate is preferably formed from at least one layer of paper and/or from at least one plastics film and/or from at least one metal foil. The carrier substrate is preferably transparent at least in a region-wise manner, wherein it is advantageous if such a transparent region overlaps with at least one of the film elements, with the result that an optically variable effect is also visible on the rear side of the security document.

It has proven useful if the at least one second film element has a further relief structure on its side which faces away from the at least one first film element. Such a further relief structure is in particular in the form of a macroscopic and/or microscopic relief structure. The further relief structure is preferably visually and/or haptically detectable. The further relief structure can in this case form a pattern, a guilloche structure, a lens structure, a matt structure, a diffractive structure and so on, or a combination thereof.

The security document is, in particular, an identity card, a passport, an identity pass, a bank card, a driver's license, a bond, a banknote, a lottery ticket, a travel ticket, a certificate, a reference or a label for protecting and/or tracing goods.

A method comprising the following steps has proven useful for the production of a security document according to the invention:

providing the carrier substrate;

providing a transfer film having a carrier film and a transfer layer which can be detached from the carrier film;

fixing regions of the transfer layer of the transfer film to the carrier substrate, which form the at least one first film element;

printing the at least one first printing ink layer onto the at least one first film element and regions of the carrier substrate which are free therefrom or onto the at least one second film element;

fixing the at least one second film element to the at least one first film element and regions of the carrier substrate which are free therefrom such that at least regions of the at least one first printing ink layer are arranged between the at least one first film element and the at least one second film element and can be read through the at least one second film element.

The method is suitable especially for the continuous production of security documents, in particular in a roll-to-roll method, in which the carrier substrate is processed in the manner of a web.

The transfer layer of the transfer film is transferred in a region-wise manner onto the carrier substrate preferably by embossing the transfer film. Here, the transfer film is pressed against the carrier substrate using an embossing tool and is fixed to the carrier substrate using an adhesive layer. The adhesive layer can in this case be applied, in particular partially, onto the carrier substrate or be arranged over the whole area or partially on that side of the transfer layer which faces the carrier substrate. The embossing tool can be in the form of an embossing punch with a defined contour or as an embossing roller with a structured or smooth surface.

It is particularly preferred if the at least one first film element and/or the at least one second film element has a film thickness in the range of 3 to 25 µm and is embossed onto the carrier substrate. In particular, first and second film elements are designed to be thin using transfer film techniques. Alternatively, however, it is just as possible that the at least one first film element has a film thickness in the range of 3 to 25 µm and is embossed onto the carrier substrate, and that the at least one second film element has a film thickness in the range of 15 to 250 µm and is laminated onto the at least one first film element and regions of the carrier substrate which are free therefrom.

BRIEF DESCRIPTION OF THE DRAWINGS

FIG. 1a shows the individual layers for forming a security document in three-dimensional representation and FIG. 1b shows the security document formed from the layers in FIG. 1a in three-dimensional representation.

DETAILED DESCRIPTION OF THE INVENTION

Figure 1A:
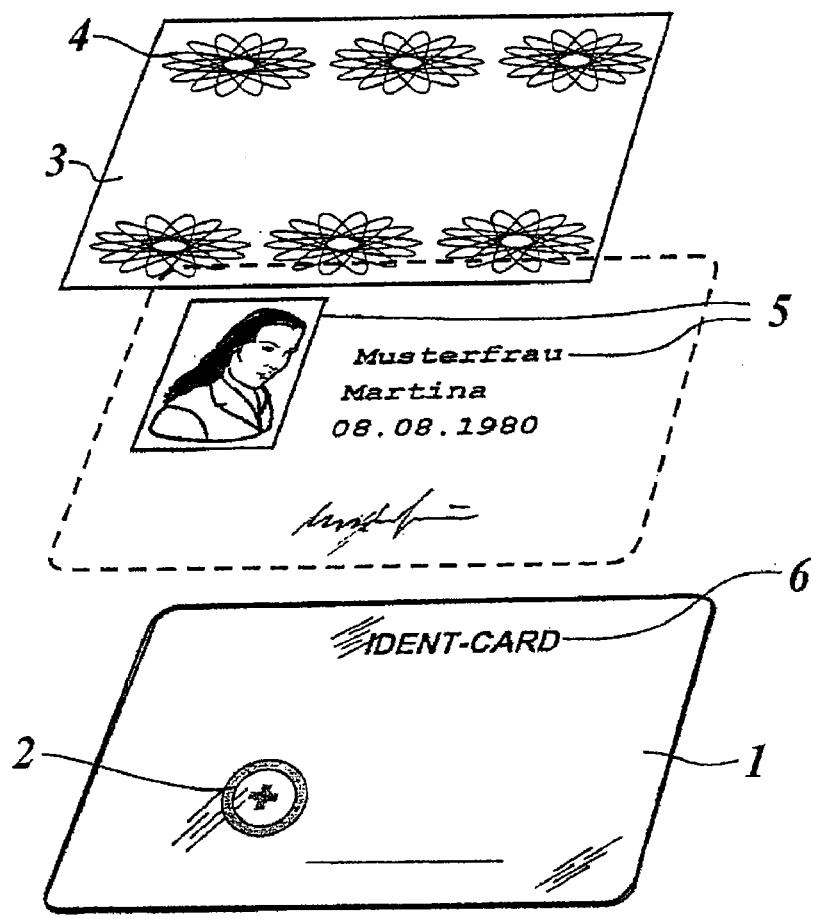
FIGS. 1a and 1b are meant to illustrate in an exemplary fashion a security document according to the invention. In the figures
Figure 1B:
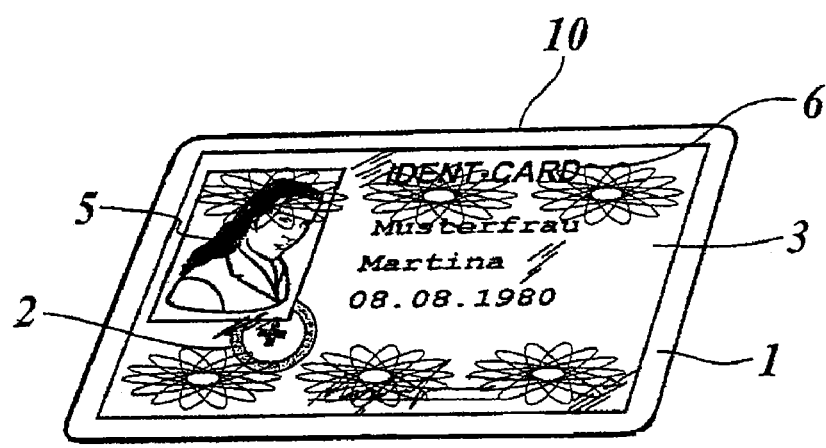

FIG. 1a shows a three-dimensional representation of the individual layers for forming a security document (see FIG. 1b) in the form of an ID card. A carrier substrate 1 of Teslin (synthetic printing medium) forms a first layer on which a second printing ink layer 6 is printed to form the lettering "IDENTOCARD". Furthermore, a round first film element 2 is embossed onto the carrier substrate 1 using a transfer film, wherein the first film element 2 shows a hologram. A first printing ink layer 5 is formed on the thus prepared carrier substrate 1 by printing aqueous printing ink using the inkjet method and drying it, wherein the first printing ink layer 5 shows, as a first information item, personal data of the holder of the security document 10, such as the name, the date of birth, the signature and a picture. The surface of the embossed-on first film element 2 must in this case be sufficiently printable for the aqueous printing ink. The first printing ink layer 5 overlaps in this case with the first film element 2 in the region of the picture. Adhesively bonded on top of this is a transparent second film element 3 which completely covers the first printing ink layer 5 and the first film element 2. The second film element 4 has a diffractive relief structure 4 which produces a cinematographic, optically variable effect. Parts of the first printing ink layer 5 (here in particular the image) are located embedded between the first film element 2 and the second film element 3 and are thus not accessible for manipulation either from the rear side of the security document 10 or from the front side shown in FIG. 1b.

The contour shapes of the first and second film elements, the arrangement thereof with respect to one another and the degree of overlap thereof with respect to one another and with respect to the first printing ink layer are selectable within broad limits, as is the design of the first printing ink layer itself, with the result that there are a multiplicity of further possibilities of designing the security document according to the invention. For example, the at least one first film element can cover a side of the carrier substrate completely or only partially, have a graphically designed contour and so on. The at least one second film element can cover the at least one first film element completely or only partially, can cover the at least one first printing ink layer completely or only partially, can likewise have a graphically designed contour and can furthermore cover, or partially cover, only one first film element or a number of first film elements from a multiplicity of first film elements and so on.

The invention claimed is:

1. A security document having a carrier substrate and at least one first film element which is fixed to the carrier substrate and shows a first optically variable effect generated by a diffractive first relief structure, wherein the security document furthermore has at least one first printing ink layer which is applied in a region-wise fashion onto the at least one first film element, and
    wherein the at least one first printing ink layer is furthermore applied in a region-wise fashion onto the carrier substrate, wherein the regions of the at least one first printing ink layer, which are applied onto the at least one first film element and onto the carrier substrate, together provide a first information item which can be read, and
    wherein the security document has at least one second film element which shows a second optically variable effect generated by a diffractive second relief structure, wherein the at least one second film element is transparent or at least transparent in regions, and
    wherein the at least one second film element is fixed at least in regions to the at least one first film element and furthermore to regions of the carrier substrate which are free from the at least one first film element, wherein at least regions of the at least one first printing ink layer are arranged between the at least one first film element and the at least one second film element and can be read through the at least one second film element.

2. The security document as claimed in claim 1, wherein the at least one first film element has a film thickness in the range of 3 to 25 µm.

3. The security document as claimed in claim 1, wherein the at least one second film element has a film thickness in the range of 3 to 250 µm.

4. The security document as claimed in claim 1, wherein the first information item is provided by personal data of a holder of the security document.

5. The security document as claimed in claim 4, wherein the personal data of the holder of the security document include a picture of the holder and/or biometric data of the holder and/or are coded.

6. The security document as claimed in claim 1, wherein the first optically variable effect and the second optically variable effect are matched to each other such that the at least one first film element and the at least one second film element together provide a second information item.

7. The security document as claimed in claim 6, wherein the second information item provides personal data of a holder of the security document.

8. The security document as claimed in claim 6, wherein the second information item provides a holographic or cinematographic representation.

9. The security document as claimed in claim 1, wherein the security document has at least one IC microchip and wherein the at least one first film element and/or the at least one second film element have an electrically conducting layering which is/are connected in an electrically conducting manner to the IC microchip.

10. The security document as claimed in claim 1, wherein the at least one first printing ink layer is printed onto the at least one first film element and the carrier substrate.

11. The security document as claimed in claim 1, wherein the at least one first printing ink layer is printed onto the at least one second film element.

12. The security document as claimed in claim 1, wherein at least one second printing ink layer is printed onto the carrier substrate in a region-wise manner.

13. The security document as claimed in claim 1, wherein the carrier substrate is formed from at least one layer of paper and/or from at least one plastics film and/or from at least one metal foil.

14. The security document as claimed in claim 1, wherein the security document is an identity card, a passport, an identity pass, a bank card, a driver's license, a bond, a certificate, a reference, a banknote, a lottery ticket, a travel ticket, or a label for protecting and/or tracing goods.

15. The security document as claimed in claim 1, wherein the at least one first printing ink layer is colored and opaque when viewed under normal light conditions.

16. The security document as claimed in claim 1, wherein the at least one first printing ink layer, when viewed under normal light conditions, is without color and transparent and contains luminescent substances which emit a color when subjected to UV radiation in the visible wavelength range.

17. The security document as claimed in claim 1, wherein the at least one first film element has at least one transparent first plastics or lacquer layer and at least one first reflection layer, wherein the diffractive first relief structure is formed in a first boundary surface between the at least one first plastics or lacquer layer and the at least one first reflection layer.

18. The security document as claimed in claim 1, wherein the at least one second film element has at least one transparent second plastics or lacquer layer and at least one transparent or regionally formed opaque second reflection layer, wherein the diffractive second relief structure is formed in a boundary surface between the at least one second plastics or lacquer layer and the at least one second reflection layer.

19. The security document as claimed in claim 1, wherein at least two first film elements are present.

20. The security document as claimed in claim 1, wherein at least two second film elements are present.

21. The security document as claimed in claim 1, wherein the at least one second film element has a further relief structure on its side which faces away from the at least one first film element.

22. A method for the production of a security document as claimed in claim 1, comprising the following steps:
   providing the carrier substrate;
   providing a transfer film having a carrier film and a transfer layer which can be detached from the carrier film;
   fixing regions of the transfer layer of the transfer film to the carrier substrate, which form the at least one first film element;
   printing the at least one first printing ink layer onto the at least one first film element and regions of the carrier substrate which are free therefrom or onto the at least one second film element;
   fixing the at least one second film element to the at least one first film element and regions of the carrier substrate which are free therefrom such that at least regions of the at least one first printing ink layer are arranged between the at least one first film element and the at least one second film element and can be read through the at least one second film element.

23. The method as claimed in claim 22, wherein the at least one first film element and/or the at least one second film element has a film thickness in the range of 3 to 25μm and is embossed onto the carrier substrate.

24. The method as claimed in claim 22 wherein the at least one first film element has a film thickness in the range of 3 to 25 μm and is embossed onto the carrier substrate, and wherein the at least one second film element has a film thickness in the range of 15 to 250 μm and is laminated onto the at least one first film element and regions of the carrier substrate which are free therefrom.

25. The method as claimed in claim 22, wherein the at least one first printing ink layer is formed in an inkjet printing method.

26. The method as claimed in claim 22, wherein the at least one first printing ink layer is formed by printing at least one aqueous printing ink medium and drying it.

\* \* \* \* \*

UNITED STATES PATENT AND TRADEMARK OFFICE
CERTIFICATE OF CORRECTION

| | | |
|---|---|---|
| PATENT NO. | : 8,286,880 B2 | |
| APPLICATION NO. | : 12/739500 | |
| DATED | : October 16, 2012 | |
| INVENTOR(S) | : Hansen et al. | |

It is certified that error appears in the above-identified patent and that said Letters Patent is hereby corrected as shown below:

IN THE SPECIFICATION:

Column 7, line 9, now reads "security document (see"

should read -- security document 10 (see --

Signed and Sealed this
Sixth Day of August, 2013

Teresa Stanek Rea
*Acting Director of the United States Patent and Trademark Office*